United States Patent [19]

Monnier

[11] Patent Number: 5,709,191
[45] Date of Patent: Jan. 20, 1998

[54] PROCESS AND DEVICE FOR CONTROLLING THE INTAKE AIR OF A SPARK-IGNITION FOUR-STROKE ENGINE

[75] Inventor: Gaétan Monnier, Rueil-Malmaison, France

[73] Assignee: Institut Francais du Peetrole, Rueil-Malmaison, France

[21] Appl. No.: 664,516

[22] Filed: Jun. 17, 1996

[30] Foreign Application Priority Data

Jun. 19, 1995 [FR] France ................................ 95 07384

[51] Int. Cl.$^6$ ........................ F02M 25/07; F02M 35/108
[52] U.S. Cl. ........................ 123/302; 123/569; 123/585
[58] Field of Search ........................ 123/302, 308, 123/432, 568, 569, 570, 571, 585, 586

[56] References Cited

U.S. PATENT DOCUMENTS

| | | | |
|---|---|---|---|
| 4,153,024 | 5/1979 | Bertling | 123/585 |
| 4,354,464 | 10/1982 | Fujita | 123/585 |
| 4,498,429 | 2/1985 | Satow et al. | 123/585 |
| 4,841,935 | 6/1989 | Yamada et al. | 123/585 |
| 4,856,473 | 8/1989 | Kawai et al. | 123/570 |
| 5,233,956 | 8/1993 | Ueda et al. | 123/302 |
| 5,237,973 | 8/1993 | Oda | 123/568 |
| 5,329,912 | 7/1994 | Matsumoto et al. | 123/568 |

*Primary Examiner*—Willis R. Wolfe
*Attorney, Agent, or Firm*—Antonelli, Terry, Stout & Kraus, LLP

[57] ABSTRACT

The invention relates to a device for controlling the intake air of a spark-ignition four-stroke engine with direct injection of fuel into combustion chamber (1), comprising a main pipe (2) equipped with a throttling means (9), at least a first (3) and a second (4) intake pipe coming from main pipe (2) and opening each into combustion chamber (1), a pipe (7) for recycling the exhaust gases back to the intake equipped with a throttling means (8) and that opens downstream from the throttling means (9) of the main pipe and a means for controlling the air flow supplied to the combustion chamber. According to the invention, said air flow control means comprises a pipe (10) mounted as a bypass on said main pipe (2), around the throttling means (9) thereof, said pipe (10) having a section substantially equal to that of main pipe (2), and a means (11, 12; 14) allowing to seal at least said bypass (10) as a function of the running conditions of the engine.

11 Claims, 1 Drawing Sheet pipes 3 and 4.

PROCESS AND DEVICE FOR CONTROLLING THE INTAKE AIR OF A SPARK-IGNITION FOUR-STROKE ENGINE

FIELD OF THE INVENTION

The present invention relates to the field of spark-ignition four-stroke engines with direct fuel injection.

More precisely, the present invention relates to the control of the intake and more particularly of the air flow in such engines.

BACKGROUND OF THE INVENTION

The development of direct gasoline injection in spark-ignition four-stroke engines allows a combustion referred to as stratified combustion where the flammable air-fuel mixture is confined in a part of the chamber and where the other part of the chamber is filled with either air or a mixture of air and recycled burned gases.

The stratified mode operation allows to eliminate the pumping loop from the spark-ignition four-stroke engine, responsible for a great drop of efficiency of the Beau de Rochas cycle at partial loads.

However, the engine cannot run permanently in this way, notably because of catalytic depollution reasons. The various methods of operation of the engine, i.e. mainly the stratified combustion mode and the homogeneous mixture combustion mode, must therefore be mastered by means of a system for controlling the air flow supplied to the engine.

Conventionally, this well-known function is fulfilled by a motorized throttle. The torque demand of the vehicle is then transmitted to a control calculator by a potentiometer and it is the calculator that, as a function of the data entered and of the programming thereof, actuates one or the other of the aforementioned methods of operation of the engine.

In practice, this solution poses cost problems: the calculator and its interfaces, its programming.

Safety is also called into question since the actuation function or the switching from one method of operation to another is no longer controlled by the driver of the vehicle but by an electronic system comprising a calculator. In other words, the air flow in the engine is no longer mechanically linked and therefore controlled by the driver.

It is also well-known through patent U.S. Pat. No. 4,192,262, in order to improve the scavenging of the combustion chamber, to provide an additional intake by means of which pressurized air is injected in a controlled way, as a function of the running conditions of the engine.

The disadvantage of the aforementioned known systems is that they all are relatively sophisticated, which increases their costs.

The present invention allows notably to overcome the aforementioned problems.

In fact, the present invention consists in a mainly mechanical and simple solution to the problem of the intake air flow control.

SUMMARY OF THE INVENTION

The object of the present invention is thus a device for controlling the intake air of a spark-ignition four-stroke engine with direct injection of fuel into the combustion chamber, comprising a main pipe equipped with a throttling means, at least a first and a second intake pipe coming from the main pipe and opening each into the combustion chamber, a pipe for recycling the exhaust gases back to the intake equipped with a throttling means and that opens downstream from the throttling means of the main pipe, and a means for controlling the air flow supplied to the combustion chamber.

According to the invention, said air flow control means comprises a pipe mounted as a bypass on said main pipe, around the throttling means thereof, said bypass having a section substantially equal to that of the main pipe, and a means for sealing at least said bypass as a function of the running conditions of the engine.

Specifically, the second intake pipe is equipped with a nonreturn valve and the bypass comprises a throttling means.

According to an embodiment of the invention, the seal means is placed at the junction of the bypass and of the second pipe, and it allows to seal selectively one or the other of said pipes.

According to another embodiment of the invention, said bypass is situated upstream from the inlet manifold of a multicylinder engine.

The invention also relates to a control process implemented by means of the device as claimed in any one of the previous claims, characterized in that it consists in controlling differently the intake air flow according to at least two methods of operation of the engine.

More precisely, the two methods of operation correspond respectively to a stratified combustion and to a homogeneous combustion.

According to the invention, for a stratified combustion, the air is fed into the combustion chamber through each of the intake pipes and/or through the bypass.

In accordance with the invention, for a stratified combustion with exhaustgas recirculation, a mixture of recycled exhaust gases and of air is fed into the combustion chamber through the first intake pipe.

Advantageously, for a homogeneous combustion, the air supplied to the combustion chamber is fed through the common pipe, then simultaneously and only through the first and the second intake pipe, the bypass being then closed by the throttling means.

Besides, for a homogeneous combustion with exhaust-gas recirculation, the air is mainly fed through the second pipe while a mixture of air and of recycled gases is mainly fed through the first pipe, the bypass being then closed by the throttling means.

BRIEF DESCRIPTION OF THE DRAWINGS

Other features, advantages and details of the invention will be clear from reading the description hereafter, given by way of non limitative examples, with reference to the accompanying drawings in which.

DESCRIPTION OF THE INVENTION

Figure 1:
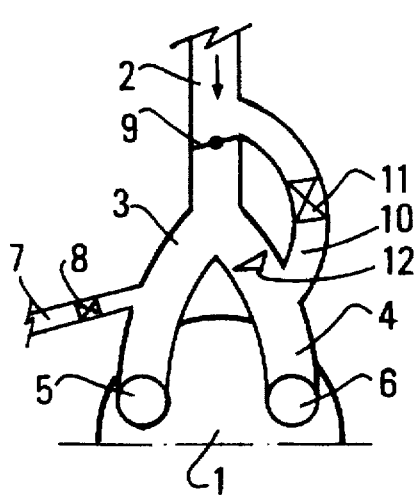
FIG. 1 is a diagram of the control device according to an embodiment of the invention.

According to FIG. 1, air is fed into combustion chamber 1 through a main pipe that conventionally divides into as many pipes as there are intake ports 5, 6 in combustion chamber 1. Here, the two pipes bear reference numbers 3 and 4.

A pipe 7 for recycling the exhaust gases can open into one of the two intake pipes 3, 4. Exhaust-gas recirculation pipe 7 is preferably equipped with a throttling means 8.

Besides, a throttling means 9, commonly referred to as "throttle", which conventionally corresponds to the torque requested by the driver as he steps on the accelerator pedal, is mounted in the main pipe 2.

According to the invention, a pipe 10 is mounted as a bypass on the main pipe 2, around the throttling means 9 thereof.

Bypass 10 advantageously has a cross-section substantially equal to that of main pipe 2.

Besides, a means 11 is provided in order to seal at least said bypass line 10 (or bypass 10).

According to FIG. 1, means 11 comprises a valve placed in bypass 10 that opens into intake pipe 4. A nonreturn valve 12 is then preferably associated with the operation of valve 11, the nonreturn valve being situated in the intake pipe 4 that does not receive the recycled gases.

Figure 2:
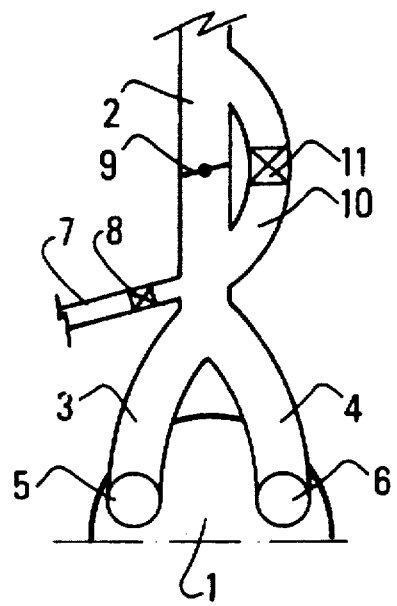
FIG. 2 is a diagram of the device according to another embodiment of the invention.

The embodiment of the invention illustrated in FIG. 2 differs from that described above in the position of bypass 10. Both ends thereof open here into the main pipe 2, on either side of throttle 9. As in FIG. 1, a throttling means 11 is placed in bypass 10 but no additional nonreturn valve is required here.

Figure 3:
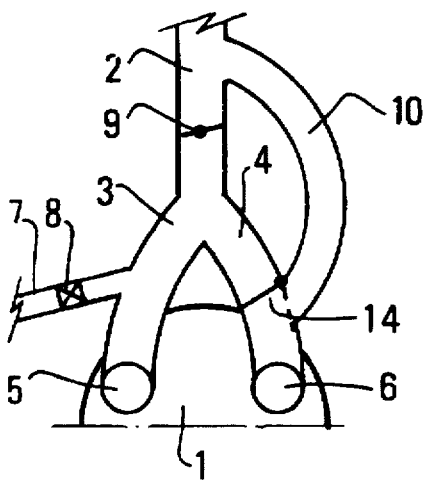
FIG. 3 is a diagram relative to yet another embodiment of the invention.

FIG. 3 illustrates an embodiment of the invention that differs from that of FIG. 1 in the throttling of pipes 4 and 10.

More precisely, a single means 14, here in the form of a throttle, is provided instead of valve 11 and of nonreturn valve 12.

Throttle 14 is an "on-off" throttle that, according to the desired method of operation, can seal bypass 10 or pipe 4.

Figure 4:
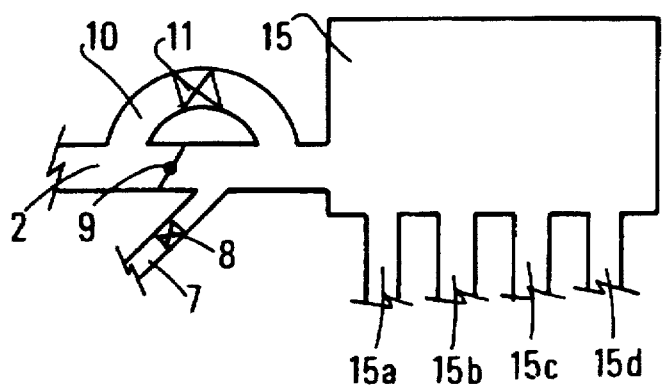
FIG. 4 is a simplified diagram of the application of the invention to a multicylinder engine.

FIG. 4 relates more particularly to an application of the invention to a multicylinder engine in which bypass 10 is placed upstream from manifold 15 that distributes the air and/or the fuel mixture to each of the cylinders via specific inlets: 15a, 15b, 15c, 15d in the case of FIG. 4.

The operation of the control device according to the invention is described hereunder in connection with all of the embodiments described above.

As reminded at the beginning of the description, it is a question of being able to control the intake air flow in a simple, reliable and economical way with the two main methods of operation of the engines considered, i.e. in stratified mode and in homogeneous mode.

In fact, each of these modes divides into two different operations depending on whether exhaust gases are recycled back to the intake or not.

In stratified mode without exhaust-gas recirculation (without EGR), valve 8 thus being closed, valve 11 is then open so that intake ports 5 and 6 receive each a full air flow. In the embodiment of FIG. 3, throttle 14 opens bypass 10 and produces the same result.

However, if, according to FIG. 1, the nonreturn valve 12 is used, then only the port 6 associated with intake pipe 10 receives the air.

In stratified mode with EGR, valve 8 is open and bypass 10 is not sealed. If, according to FIG. 1, nonreturn valve 12 is used, the port 5 receives a mixture of air and of EGR, which allows the EGR to be stratified in combustion chamber 1. The same configuration is obtained with the embodiment of FIG. 3 by forming pipe 4 and by opening bypass 10.

In homogeneous mode without EGR, valve 8 is closed and bypass 10 is sealed (either by valve 11 or by strangler 14). We thus have the conventional case of the operation of a spark-ignition four-stroke engine where a homogeneous mixture is obtained in the combustion chamber thanks to a symmetrical air inflow into the combustion chamber via the two intake pipes 3 and 4.

In homogeneous mode with EGR, bypass 10 remains sealed whereas valve 8 is open. If valve 12 is used (in the case of FIG. 1), the EGR then only flows in through pipe 3, which is a way of stratifying the EGR while remaining in the homogeneous mode.

It emerges therefrom that an appropriate control of valves 8 and 11 (or 8 and 14 in the case of FIG. 3) allows to obtain, in a simple and mainly mechanical way, all the desired methods of operation achieved until then by electric or electronic means. The aforementioned valves being controlled to work in "on-off" mode, their control as well as their operation remains simple. This constitutes a real simplification in relation to the prior art. In other words, management and control of the intake air flow in a spark-ignition four-stroke engine with direct injection of fuel into the combustion chamber are here perfectly achieved.

Each of the two main methods of operation, i.e. in stratified mode, that is with a full intake air flow and a Combustion in excess air, and in homogeneous mode that corresponds to a stoichiometric combustion, is perfectly operated.

Furthermore, the change of method of operation can be achieved almost instantaneously, thus perfectly meeting the requirements of current engines.

I claim:

1. A device for controlling the intake air of a spark-ignition four-stroke engine with direct injection of fuel into combustion chamber (1), comprising a main pipe (2) equipped with a throttling means (9) and opening into or near to combustion chamber (1), and a means for controlling the intake air flow supplied to the combustion chamber, wherein said air flow control means comprises a pipe (10) mounted as a bypass on said main pipe (2), around the throttling means (9) thereof, said pipe (10) having a section substantially equal to that of main pipe (2), and a means (11, 12; 14) allowing to seal at least said bypass (10) as a function of the running conditions of the engine.

2. A device as claimed in claim 1, further comprising at least a first (3) and a second (4) intake pipe coming from main pipe (2) and a pipe (7) for recycling the exhaust gases back to the intake, equipped with a throttling means (8), and that opens downstream from throttling means (9) of the main pipe.

3. A device as claimed in claim 2, wherein the second intake pipe (4) is equipped with a nonreturn valve (12) and bypass (10) comprises a throttling means (11).

4. A device as claimed in claim 2, wherein seal means (14) is situated at the junction of bypass (10) and of the second pipe (4), and it allows to seal selectively one or the other of said pipes (10, 4).

5. A device as claimed in claim 1, wherein said bypass (10) is placed upstream from the intake manifold of a multicylinder engine.

6. A control process implemented by the device as claimed in claim 1, consisting in controlling differently the intake air flow according to at least two methods of operation of the engine.

7. A process as claimed in claim 6, wherein the two methods of operation correspond respectively to a stratified combustion and to a homogeneous combustion.

8. A process as claimed in claim 7, wherein for a stratified combustion, air is fed into the combustion chamber through each of the intake pipes and/or through bypass (10).

9. A process as claimed in claim 8, wherein for a stratified combustion with exhaust-gas recirculation, a mixture of recycled exhaust gases and of air is fed into combustion chamber (1) through the first intake pipe (3).

10. A process as claimed in claim 6, wherein for a homogeneous combustion, the air supplied to combustion chamber (1) is fed through the common pipe (2), then simultaneously and only through the first and the second intake pipe (3, 4), bypass (10) being then closed by throttling means (11).

11. A process as claimed in claim 6, wherein for a homogeneous combustion with exhaust-gas recirculation, air is mainly supplied via the second pipe (4), while a mixture of air and of recycled gases is mainly fed through the first pipe (3), bypass (10) being then closed by the throttling means.

* * * * *